US011651640B2

(12) United States Patent
Schlacks, IV et al.

(10) Patent No.: US 11,651,640 B2
(45) Date of Patent: May 16, 2023

(54) METHOD, SYSTEM AND APPARATUS FOR EQUIPMENT MONITORING AND ACCESS CONTROL

(71) Applicant: EQUIPMENTSHARE.COM INC, Columbia, MO (US)

(72) Inventors: William John Schlacks, IV, Columbia, MO (US); Jabbok Schlacks, Columbia, MO (US)

(73) Assignee: EQUIPMENTSHARE.COM INC, Columbia, MO (US)

( * ) Notice: Subject to any disclaimer, the term of this patent is extended or adjusted under 35 U.S.C. 154(b) by 0 days.

(21) Appl. No.: 17/361,917

(22) Filed: Jun. 29, 2021

(65) Prior Publication Data

US 2021/0343096 A1    Nov. 4, 2021

Related U.S. Application Data

(63) Continuation of application No. 16/335,319, filed as application No. PCT/US2017/052745 on Sep. 21, 2017.

(60) Provisional application No. 62/466,693, filed on Mar. 3, 2017, provisional application No. 62/397,673, filed on Sep. 21, 2016.

(51) Int. Cl.
*G07C 9/27* (2020.01)
*H04L 67/306* (2022.01)

(52) U.S. Cl.
CPC .............. *G07C 9/27* (2020.01); *H04L 67/306* (2013.01)

(58) Field of Classification Search
None
See application file for complete search history.

(56) References Cited

U.S. PATENT DOCUMENTS

| | | | | |
|---|---|---|---|---|
| 5,660,246 A * | 8/1997 | Kaman | ................... | B60R 25/20 180/287 |
| 5,745,850 A * | 4/1998 | Aldermeshian | ....... | H04W 84/02 455/420 |
| 5,965,954 A * | 10/1999 | Johnson | ................... | B60R 25/04 307/10.3 |
| 6,333,690 B1 * | 12/2001 | Nelson | ................... | G06Q 50/18 340/8.1 |
| 6,351,703 B1 * | 2/2002 | Avery, Jr. | ................. | B60R 25/04 307/10.6 |
| 6,496,107 B1 * | 12/2002 | Himmelstein | ......... | G07C 9/257 726/19 |
| 6,570,486 B1 * | 5/2003 | Simon | .................... | B60R 25/04 340/5.1 |

(Continued)

*Primary Examiner* — Carlos Garcia
(74) *Attorney, Agent, or Firm* — Stinson LLP

(57) ABSTRACT

A method of asset access control includes: storing, at an access control server: an asset record corresponding to a physical asset and containing an asset identifier corresponding to the asset; and an account record corresponding to a user of the physical asset and containing an account identifier; receiving, at the access control server from a client computing device, an authorization request containing the asset identifier and the account identifier; determining, based on a comparison between the asset record and the account record, whether to authorize the request; when the determination is affirmative, transmitting an instruction to a collector device mounted on the physical asset to permit subsequent access to the asset.

23 Claims, 6 Drawing Sheets

(56) References Cited

U.S. PATENT DOCUMENTS

| | | | | |
|---|---|---|---|---|
| 6,571,218 B1* | 5/2003 | Sadler | G06Q 20/20 | 705/16 |
| 6,580,972 B1* | 6/2003 | Strohbeck | G07C 5/085 | 701/1 |
| 6,892,950 B1* | 5/2005 | Jordan | G06K 19/08 | 235/441 |
| 7,068,149 B2* | 6/2006 | Lee | G06Q 10/08 | 235/382 |
| 7,165,040 B2* | 1/2007 | Ehrman | G07B 15/00 | 705/28 |
| 7,397,363 B2* | 7/2008 | Joao | B60R 25/33 | 340/428 |
| 7,568,616 B2* | 8/2009 | Zuili | G07F 7/0886 | 235/382 |
| 8,410,901 B2* | 4/2013 | Mullin | G06Q 30/0645 | 340/5.7 |
| 8,631,093 B2* | 1/2014 | Defosse | G07F 9/026 | 713/168 |
| 8,659,420 B2* | 2/2014 | Salvat, Jr. | G06Q 10/08 | 705/28 |
| 9,365,188 B1* | 6/2016 | Penilla | G06Q 30/0643 | |
| 9,373,201 B2* | 6/2016 | Jefferies | G06Q 30/0645 | |
| 9,911,255 B2* | 3/2018 | Lee | G07C 9/20 | |
| 10,455,070 B2* | 10/2019 | Chen | H04M 1/72409 | |
| 10,576,934 B2* | 3/2020 | Hassani | G06V 40/10 | |
| 2002/0135466 A1* | 9/2002 | Bunyan | G07C 9/00309 | 340/426.1 |
| 2003/0023453 A1* | 1/2003 | Hafen | G06Q 10/10 | 705/5 |
| 2003/0034873 A1* | 2/2003 | Chase | G07B 15/00 | 340/5.2 |
| 2003/0120509 A1* | 6/2003 | Bruch | G07F 17/0042 | 705/5 |
| 2003/0137398 A1* | 7/2003 | Shibata | E02F 9/205 | 340/5.72 |
| 2004/0184589 A1* | 9/2004 | Tamada | H04L 63/083 | 379/121.06 |
| 2004/0189439 A1* | 9/2004 | Cansino | H04L 67/025 | 340/5.2 |
| 2004/0214600 A1* | 10/2004 | Schechet | H04M 1/72445 | 455/556.1 |
| 2005/0073197 A1* | 4/2005 | Matsubara | B60R 25/209 | 340/5.6 |
| 2005/0162283 A1* | 7/2005 | Salazar Cardozo | H04Q 9/00 | 340/870.11 |
| 2005/0179517 A1* | 8/2005 | Harms | G07F 5/26 | 70/277 |
| 2005/0204591 A1* | 9/2005 | Mieger | E02F 3/3654 | 37/468 |
| 2005/0264396 A1* | 12/2005 | Horkavi | B60R 25/2018 | 340/5.6 |
| 2007/0109094 A1* | 5/2007 | Sahai | B60R 25/24 | 340/5.72 |
| 2007/0198432 A1* | 8/2007 | Pitroda | G06Q 20/327 | 705/64 |
| 2007/0200671 A1* | 8/2007 | Kelley | B60R 25/257 | 455/420 |
| 2007/0247277 A1* | 10/2007 | Murchison | G07C 9/00896 | 340/5.2 |
| 2007/0266259 A1* | 11/2007 | Utsumi | G06F 21/80 | 713/183 |
| 2007/0279283 A1* | 12/2007 | Flick | G08G 1/127 | 342/357.31 |
| 2007/0289012 A1* | 12/2007 | Baird | H04L 9/321 | 726/19 |
| 2008/0122594 A1* | 5/2008 | Brecht | G07C 9/00174 | 701/2 |
| 2008/0154712 A1* | 6/2008 | Wellman | B66F 9/07581 | 705/7.26 |
| 2008/0281664 A1* | 11/2008 | Campbell | G06Q 30/04 | 705/5 |
| 2009/0015373 A1* | 1/2009 | Kelly | B60R 25/24 | 340/5.62 |
| 2009/0219135 A1* | 9/2009 | Harvey | B60R 25/2018 | 340/5.82 |
| 2010/0036560 A1* | 2/2010 | Wright | B60R 16/037 | 701/36 |
| 2010/0073125 A1* | 3/2010 | Alrabady | H04L 9/3247 | 340/5.2 |
| 2010/0171642 A1* | 7/2010 | Hassan | B60C 23/0479 | 340/992 |
| 2010/0179709 A1* | 7/2010 | Abshire | G07F 17/0057 | 701/2 |
| 2011/0128118 A1* | 6/2011 | Gilleland | G06Q 10/063114 | 340/5.2 |
| 2011/0215901 A1* | 9/2011 | Van Wiemeersch | G06K 7/10366 | 340/5.64 |
| 2012/0173655 A1* | 7/2012 | McEntee | G06F 16/951 | 709/216 |
| 2012/0313796 A1* | 12/2012 | Lee | B60Q 1/52 | 701/2 |
| 2013/0155442 A1* | 6/2013 | Kuppuswamy | H04N 1/00344 | 358/1.14 |
| 2013/0179005 A1* | 7/2013 | Nishimoto | B60R 25/24 | 701/2 |
| 2014/0028440 A1* | 1/2014 | Takeuchi | E05F 15/77 | 340/5.61 |
| 2014/0129301 A1* | 5/2014 | Van Wiemeersch | G07B 15/02 | 705/13 |
| 2014/0176303 A1* | 6/2014 | Stratton | G08C 17/02 | 340/5.61 |
| 2014/0236852 A1* | 8/2014 | Emmerton | G06Q 10/1053 | 705/321 |
| 2015/0039365 A1* | 2/2015 | Haque | G06Q 10/06311 | 705/7.13 |
| 2015/0363986 A1* | 12/2015 | Hoyos | H04L 63/0861 | 340/5.61 |
| 2016/0124434 A1* | 5/2016 | Gariepy | G05D 1/0297 | 701/23 |
| 2016/0203661 A1* | 7/2016 | Pudar | G07C 9/00571 | 340/5.25 |
| 2017/0039668 A1* | 2/2017 | Luke | G07C 5/0808 | |
| 2018/0215392 A1* | 8/2018 | Kosaka | B60W 50/12 | |
| 2019/0043283 A1* | 2/2019 | Hyde | A61B 5/0059 | |
| 2020/0043262 A1* | 2/2020 | Schlacks, IV | G07C 9/27 | |
| 2021/0065259 A1* | 3/2021 | Luong | G06Q 30/016 | |

\* cited by examiner

METHOD, SYSTEM AND APPARATUS FOR EQUIPMENT MONITORING AND ACCESS CONTROL

CROSS-REFERENCE TO RELATED APPLICATION

This application is a continuation of and claims priority to U.S. patent application Ser. No. 16/335,319, filed Sep. 21, 2017, which claims the benefit of U.S. Provisional Application No. 62/466,963, filed Mar. 3, 2017, and U.S. Provisional Application No. 62/397,673, filed Sep. 21, 2016, each of which is incorporated herein by reference in its entirety.

FIELD

The specification relates generally to deployment of equipment such as construction tools, and specifically to a method, system and apparatus for monitoring and controlling access to such equipment.

BACKGROUND

Construction and related fields of work may involve a wide variety of tasks, each of which may require different sets of physical assets, such as tooling, vehicles and other equipment. Certain assets, such as the vehicles mentioned above, may be costly to acquire and maintain. Once acquired, however, such assets may be required only for a small subset of the tasks undertaken by the owner of the assets, and may then remain idle for lengthy periods of time. Leasing the assets to other parties during such idle time may mitigate the cost of ownership. However, the variable environments in which the assets are stored and deployed pose technical challenges to effectively controlling access to the assets.

SUMMARY

According to an aspect of the specification, a method of asset access control is provided, including: storing, at an access control server: an asset record corresponding to a physical asset and containing an asset identifier corresponding to the asset; and an account record corresponding to a user of the physical asset and containing an account identifier; receiving, at the access control server from a client computing device, an authorization request containing the asset identifier and the account identifier; determining, based on a comparison between the asset record and the account record, whether to authorize the request; when the determination is affirmative, transmitting an instruction to a collector device mounted on the physical asset to permit subsequent access to the asset.

BRIEF DESCRIPTIONS OF THE DRAWINGS

Embodiments are described with reference to the following figures, in which.

DETAILED DESCRIPTION

Figure 1:
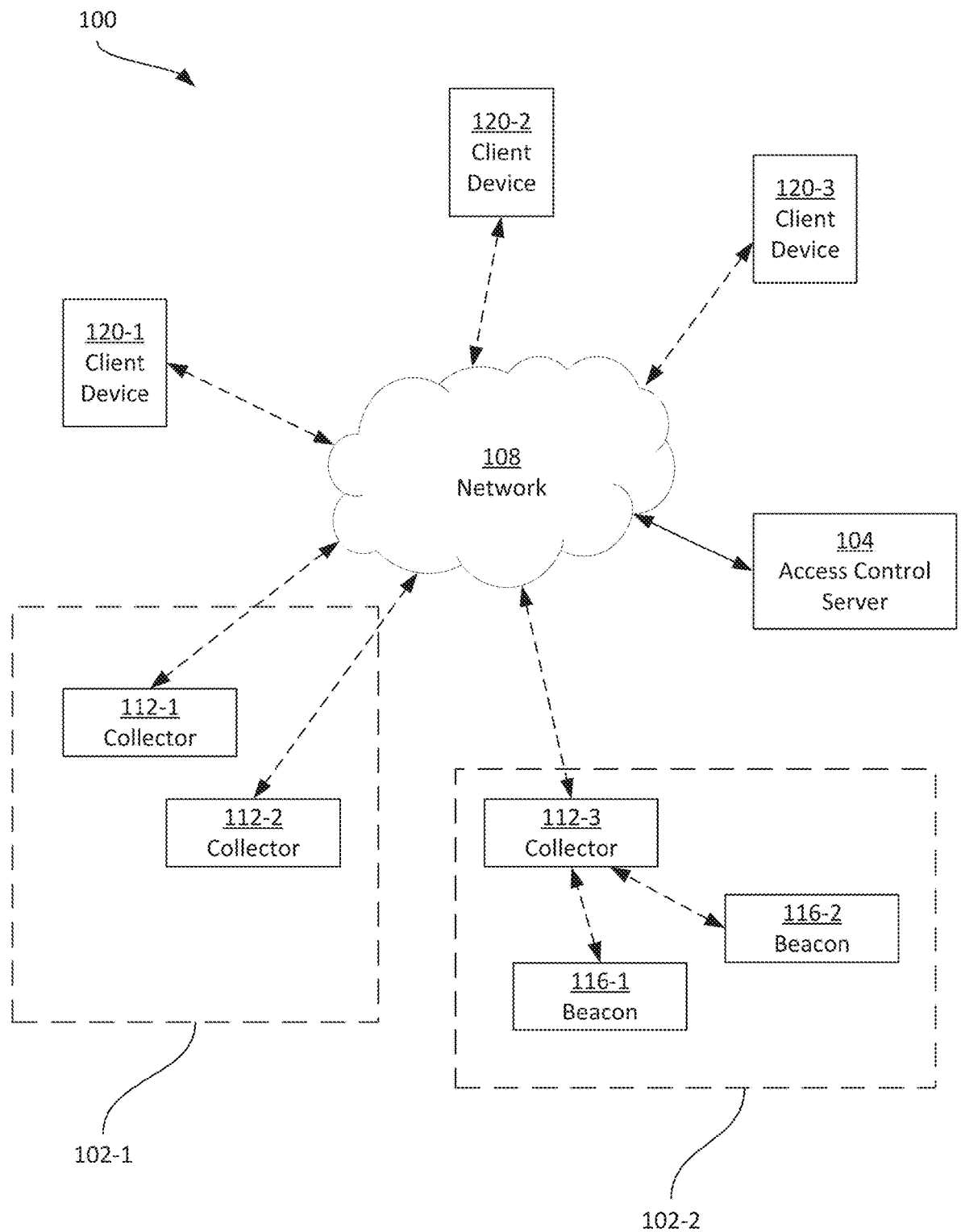
FIG. 1 depicts a system for equipment monitoring and access control.

FIG. 1 depicts a system 100 for monitoring and controlling access to assets, such as construction equipment (e.g. consumable materials, tools, vehicles and the like) located at one or more sites 102-1, 102-2 (collectively referred to as sites 102, and generically referred to as a site 102; this nomenclature may be employed elsewhere herein). Each site 102 encompasses a geographic area that is typically contiguous as well as distinct from other sites 102. The specific nature and arrangement of the sites 102, however, is not particularly limited. Each site 102 may be a construction site, a storage location, or the like. Assets need not be restricted to specific sites 102; that is, any given asset may be moved among the sites 102.

In general, an asset as referred to herein is a physical asset that may be employed by one or more operators to perform a task. Thus, vehicles such as a scissor lift, a loader, or the like, are each considered distinct assets. Although the examples discussed herein relate to assets suitable for use in the construction industry, it will be apparent to those skilled in the art that the systems and methods here may also be deployed to monitor and control access to other types of assets. Although each asset is generally owned by a particular entity (e.g. a contractor, whether an individual or an organization), the system 100 enables other entities (e.g. individuals with or without associations with other contractor organizations) to temporarily secure access to an asset for use thereof, whether on the site 102 at which the asset was stored, or elsewhere.

To that end, the system 100 includes an access control server 104 (also referred to simply as a server 104) connected to a network 108. The network 108 includes any suitable combination of wired and wireless networks, and may include both wide area networks (WANs) such as the Internet, local area networks (LANs), cellular networks, satellite-based networks, and the like.

The server 104, as will be described in greater detail below, maintains asset records corresponding to each asset for which the monitoring and access control functionality described herein is available (the functionality need not be implemented for every asset present at a site 102). The server 104 also maintains account records corresponding to individuals or organizations permitted to request access to the above-mentioned assets (i.e. to whom the monitoring and access control functionality is available). The server 104, in general, is configured to monitor the status of each asset, and to update the corresponding asset record responsive to changes in asset status. The server 104 is also configured to receive requests to access specific assets, and to determine whether to grant the requested access based on the corresponding asset record and the account record associated with the request.

As shown in FIG. 1, the server 104 is typically not located within one of the sites 102 (although in some examples the server 104 may be located at a site 102, or deployed across multiple sites 102). Further, the server 104 typically does not permit direct interaction with users wishing to secure access to the assets (e.g. a via input devices connected locally to the server 104). To enable the server 104 to monitor asset status and process access requests, the system 100 therefore also includes an asset-mounted device for each asset under management by the server 104. In the present example, two types of asset-mounted devices are contemplated. Specifically, the system includes collectors 112 (three of which, 112-1, 112-2 and 112-3, are shown in FIG. 1) and beacons 116 (two of which, 116-1 and 116-2, are shown in FIG. 1).

As will be discussed in greater detail below, the collectors 112 are capable of communicating with the server 104 via the network 108 to provide status data and access requests to the server 104. The collectors 112 are also capable of granting or denying access to the assets to which they are mounted, according to instructions received from the server 104. The beacons 116, on the other hand, are not capable of direct communication with the server 104, and are generally also not capable to granting or denying access to the assets to which they are mounted. Monitoring and access control for assets bearing beacons 116 rather than collectors 112 is implemented by the collectors 112, as will be seen below.

The system 100 also includes one or more client computing devices 120, also referred to as client devices 120 (three of which, 120-1, 120-2 and 120-3, are shown in FIG. 1). The client devices 120 are typically mobile. Each client device 120 is therefore implemented as any suitable one of a cellular phone, a smart phone, a tablet computer, a laptop computer, and the like. In general, each client device 120 includes a central processing unit (CPU) and a memory in the form of one or more integrated circuits (ICs), as well as input and output devices, such as a touch screen integrated with a display. Each client device 120 may store, in the above-mentioned memory, one or more applications that are executable by the above-mentioned processor to perform a variety of functions. For example, each client device 120 can include a web browser application which may be executed to transmit requests for web pages to the server 104 and process the responses to such requests. In other examples, each client device 120 may include an access control client application whose execution by the processor of the client device 120 specifically configures the client device 120 for interaction with the server 120.

The client computing devices 120 may also initiate requests to access assets via communication with the server 104 (e.g., via the above-mentioned web browser or access control client application). That is, access requests in the system 100 can be initiated from either the collectors 112 or the client computing devices 120, enabling the system 100 to be deployed in a variety of operating conditions, including those where, for example, client computing devices 120 are inoperable or not permitted on a site 120.

Figure 2:
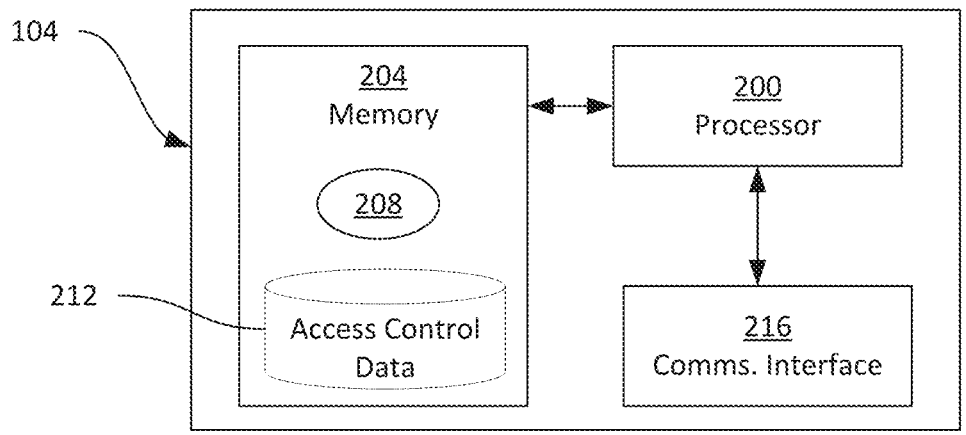
FIG. 2 depicts certain internal components of the access control server and collector device of the system of FIG. 1.
Figure 2:
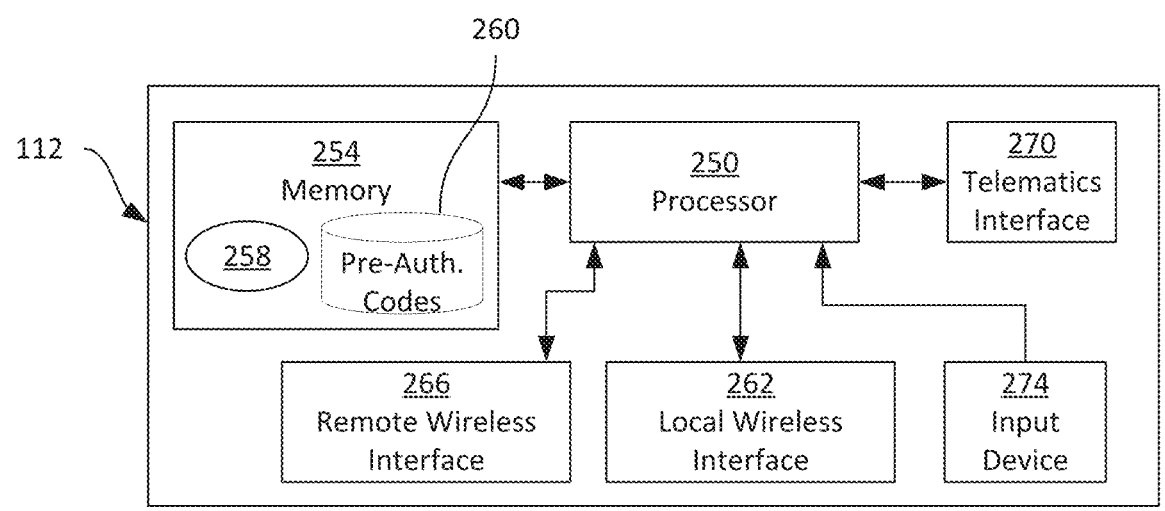

Turning to FIG. 2, before discussing the functionality of the system 100 in greater detail, certain internal components of each of the server 104 and the collectors 112 will be described.

The server 104 includes a central processing unit (CPU) 200, also referred to herein as a processor 200, in the form of one or more integrated circuits (ICs). The processor 200 is interconnected with a non-transitory computer readable storage medium, such as a memory 204. The memory 204 includes any suitable combination of volatile (e.g. Random Access Memory or RAM) and non-volatile memory (e.g. read only memory or ROM, Electrically Erasable Programmable Read Only Memory or EEPROM, flash memory). The memory 204 stores computer readable instructions executable by the processor 200, including an access control application 208, also referred to herein as the application 208.

The processor 200 executes the instructions of the application 208 to perform, in conjunction with the other components of the server 104, various functions related to monitoring the status of the assets at the sites 102, as well as controlling access to the assets responsive to requests for access from either or both of the client devices 120 and the collectors 112. In the discussion below of those functions, the server 104 is said to be configured to perform those functions—it will be understood that the server 104 is so configured via the execution of the instructions in the application 208 by the processor 200.

The server 104 also includes a communications interface 216 interconnected with the processor 200, which enables the server 104 to communicate with other computing devices, notably the client devices 120 and the collectors 112, via the network 108. The communications interface 216 thus includes the necessary hardware, such as network interface controllers and the like (e.g. one or more Ethernet controllers), to communicate over the network 108. The server 104 may also include input devices and output devices interconnected with the processor 200 for administration and configuration of the server 104, such as a keyboard, a display and the like (not shown).

In addition to the application 208 mentioned above, the memory 204 stores an access control data repository 212. The repository 212 contains the above-mentioned asset records and account records. In other examples, the asset records and the account records may be stored in two or more separate repositories, rather than in the repository 212 as illustrated in FIG. 2. In general, each asset record contains a plurality of attributes of a corresponding one of the assets at the sites 102. The attributes serve to identify the asset, represent the operational status of the asset, and define constraints to be applied to requests to access to the asset. Each account record, meanwhile, contains a plurality of attributes defining an account for which requests to access assets may be made. Examples of asset records and account records will be discussed further below.

Still referring to FIG. 2, certain internal components of a collector 112 are illustrated. As will now be apparent, each collector 112 of the system 100 includes the components shown in FIG. 2. The collector 112 includes a processor 250 interconnected with non-transitory computer readable storage medium, such as a memory 254. The processor 250 and the memory 254 are implemented as one or more ICs. The memory 254 includes any suitable combination of volatile (e.g. Random Access Memory or RAM) and non-volatile memory (e.g. read only memory or ROM, Electrically Erasable Programmable Read Only Memory or EEPROM, flash memory). The memory 254 stores computer readable instructions executable by the processor 250, including a collector application 258, also referred to herein as the application 258.

The processor 250 executes the instructions of the application 258 to perform, in conjunction with the other components of the collector 112, various functions related to monitoring the status of, and controlling access to, the asset to which the collector 112 is mounted. As will be discussed below, the collector 112 may also implement functionality permitting the monitoring of assets bearing beacons 116. The memory 254 also stores a pre-authorized code repository 260 which may be employed by the processor 250 during the execution of the application 258 to grant or deny access to assets, as will be discussed in greater detail below.

The collector 112 includes various communications interfaces permitting the collector to communicate with the server 104 (via the network 108), the beacons 116, and with components (not shown) of the asset to which the collector 112 itself is mounted. In particular, the collector 112 includes a local wireless communications interface 262, a remote wireless communications interface 266, and a telematics interface 270, each interconnected with the processor 250.

The local interface 262 enables the collector 112 to communicate with the beacons 116. The beacons 116, in the present example, do not include communications hardware configured to establish links directly with the network 108. Instead, each beacon 116 includes a local area communications assembly such as a Bluetooth radio, a Zigbee radio, a radio-frequency identifier (RFID) tag or the like. Such an assembly may have an operational range of between about 3 feet and about 300 feet. The communications assembly of the beacon 116 is configured to transmit, at configurable intervals, at least an asset identifier stored by the beacon 116 and corresponding to the asset on which the beacon 116 is mounted. In the present example, the beacons 116 are affixed to smaller or lower-value pieces of equipment than the collectors 112. For example, the beacons 116 may be mounted to hand tools and consumable materials. In particular, the assets to which beacons 116 are mounted typically do not include operational sensors and interrupt devices to which the beacons 116 can interface. The beacons 116 therefore generally do not collect status data for such assets. In the present example, therefore, the asset identifier stored (e.g. via pre-programming the asset identifier in a memory of the beacon 116) by the beacon 116 is the only data transmitted by the beacon 116. In other examples, however, certain beacons 116 can be configured to collect and transmit status data concerning the assets to which they are mounted.

The local interface 262, therefore, includes any suitable hardware necessary to receive the above-mentioned asset identifier from any beacons 116 within range of the collector 112. The local interface 262 may therefore include a Bluetooth radio, a Zigbee radio, an RFID reader, or any suitable combination thereof (as the population of beacons 116 at any given site 102 may include more than one type of local area communications assembly).

The remote interface 266 enables the collector 112 to communicate with the server 104 via the network 108. The interface 266 therefore includes any suitable components to connect to the network 108, typically by establishing a wireless link with the network 108, as the collector 112 is mounted to a movable asset, such as a vehicle. In some examples, the remote interface 266 includes one or more cellular radios. In other examples, the remote interface 266 includes a satellite radio, enabling the collector 112 to connect to the network 108 via an intermediate satellite network, which may have greater availability than cellular networks.

The telematics interface 270 interconnects the processor 250 with interrupt components and, for some assets, sensor components included in the asset to which the collector 112 is mounted. Collectors 112 are typically mounted on physically larger, higher-value assets, such as vehicles and storage enclosures (e.g. shipping containers, buildings, fenced enclosures and the like) containing other assets. More generally, the collectors 112 are mounted on assets having interrupt devices integrated therein, such as ignition interrupts in the case of a vehicle, remotely controllable locks, and the like. Some assets with collectors 112 mounted thereon, particularly vehicles, include various sensors to collect operational measurements corresponding to the vehicle (e.g. current GPS position, fuel or other power supply levels, maintenance alerts, usage statistics and the like). The telematics interface 270 interconnects the processor 250 with the above-mentioned interrupt devices and, if any are present, with sensors of the asset to which the collector 112 is mounted. As will be discussed below, the telematics interface therefore permits the processor 250 to collect operational data corresponding to the asset carrying the collector 112, and also to enable or disable access to the asset via operation of the above-mentioned interrupt device.

The collector 112 also includes an input device 274 configured to receive input from an operator of the asset to which the collector 112 is mounted and to transmit data representative of such input to the processor 250. The input device 274 includes any one of, or any suitable combination of, a keypad, a fingerprint sensor, a camera, and the like. In general, as will be discussed in greater detail below, the input device 274 permits the collector 112 to receive access requests from operators in physical proximity to the asset bearing the collector 112.

Figure 3:
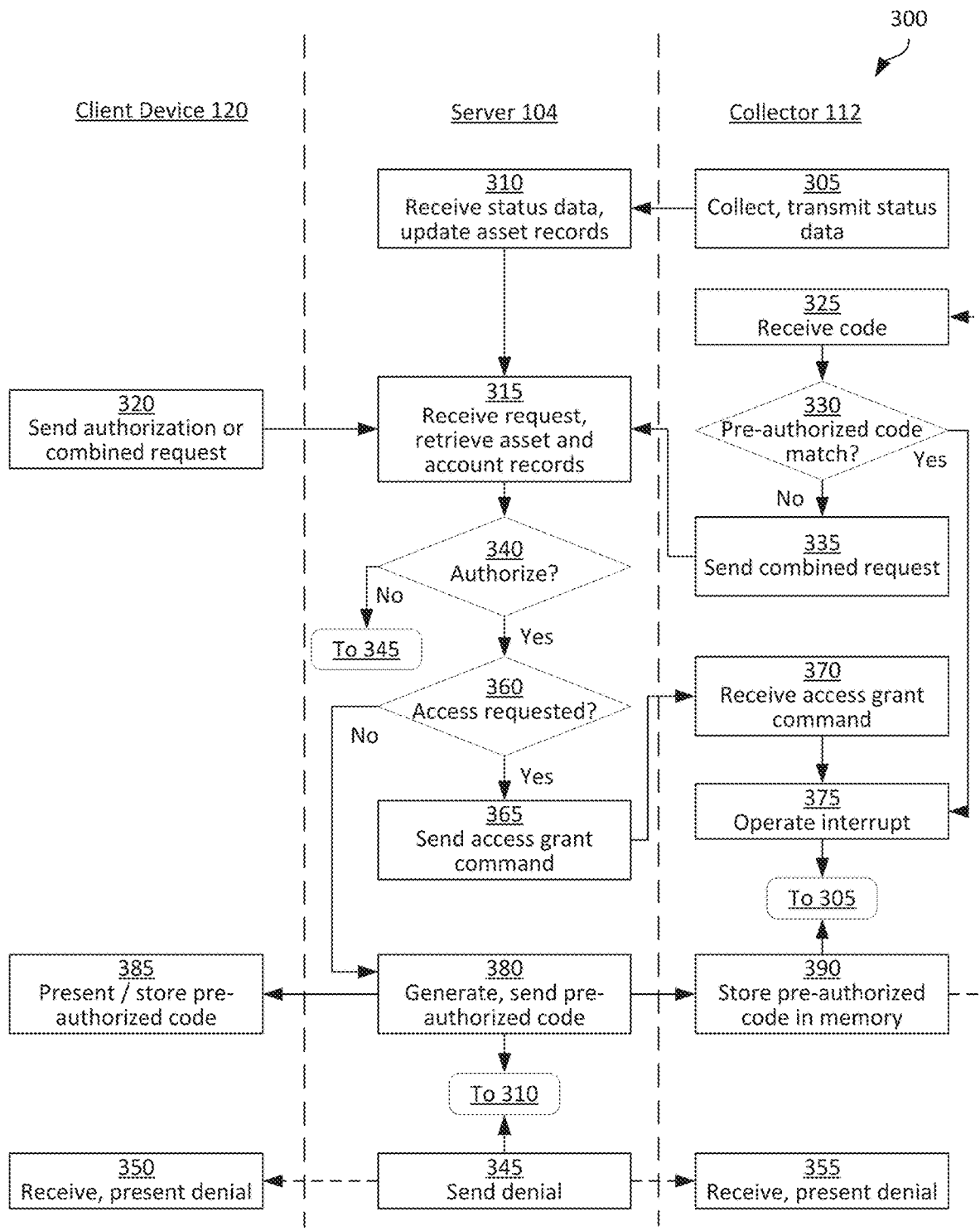
FIG. 3 depicts a method for equipment monitoring and access control in the system of FIG. 1.

Referring now to FIG. 3, a method 300 of asset monitoring and access control is depicted. The method 300 will be discussed in connection with its performance in the system 100. In particular, as shown in FIG. 3, certain blocks of the method 300 are performed by the client devices 120, while other blocks are performed by the server 104 and still others are performed by the collectors 112.

At block 305, each collector 112 is configured to collect status data and transmit the status data to the server 104 via the network 108. Specifically, the processor 250 of each collector 112 is configured to monitor any sensors included on the asset to which the collector 112 is coupled, via the interface 270, and to transmit data received from the sensors to the server 104. The performance of block 305 may be repeated according to a schedule preconfigured in the processor 250 (e.g. once per five minutes). In other examples, the performance of block 305 is initiated only responsive to the processor 250 detecting a change in the status data received via the interface 270.

At block 305, the collector 112 can also be configured to collect and transmit status data corresponding to the beacons 116. In the present example, each beacon 116 is configured to broadcast an asset identifier at a configurable interval. If a given collector 112 detects one or more such broadcasts via the local interface 262, the collector 112 is configured to store the asset identifiers contained therein in the memory 254, and to transmit the asset identifiers at block 305 along with the status data collected via the interface 270. Referring briefly to FIG. 1, no beacons 116 are present at the site 102, and the collectors 112-1 and 112-2 are therefore configured to report status data relating only to the assets to which they are respectively mounted. The site 102, on the other hand, contains assets bearing the beacons 116-1 and 116-2. The collector 112-3 may therefore be configured to detect the asset identifiers broadcast by the beacons 116-1 and 116-2, and report those asset identifiers to the server 104 at block 305, along with its own asset identifier and any status data collected via the interface 270 of the collector 112-3.

In some examples, the collectors 112 are also configured to communicate locally amongst themselves (e.g. via the interfaces 262). In the event that a collector 112 cannot establish a connection with the network 108 via the interface 266, that collector 112 can be configured to establish connections with one or more other collectors 112 via the interface 262 and transfer status data to such other collectors for relaying to the server 104. As will be apparent, the status data transmitted among collectors 112 can also include asset identifiers originally broadcast by one or more beacons 116.

At block 310, the server 104 is configured to receive the status data from the collectors 112 via the network 108, and to update the corresponding asset records in the repository 212. Table 1, below, illustrates example asset records corresponding to the system as shown in FIG. 1.

TABLE 1

Example Asset Records

| Asset ID | Condition | Fuel Level | Location | Storage | Owner ID | Access Status |
|---|---|---|---|---|---|---|
| 112-1 | License A | 40% | [Lat/Long-1] | N/A | Acme Co. | Idle |
| 112-2 | N/A | 95% | [Lat/Long-2] | N/A | Acme Co. | Idle |
| 112-3 | N/A | N/A | [Lat/Long-3] | N/A | Acme Co. | N/A |
| 116-1 | N/A | N/A | 112-3 | 112-3 | Acme Co. | Idle |
| 116-2 | N/A | N/A | 112-3 | 112-3 | Acme Co. | Idle |

As seen in Table 1, each account record includes an asset identifier. Any suitable alphanumeric string may be employed as asset identifiers; in the present example the reference numerals introduced in FIG. 1 are employed as asset identifiers for simplicity. Each account record can also include various other information (not shown) describing the asset. For example, a type of asset may be indicated (e.g. a vehicle, a hand tool, etc.), as well as or instead of a manufacturer of the asset, a model number, and the like. Each account record can also include a network address of the collector 112 mounted on the corresponding asset. Each account record also includes status data updated based on the data received from the corresponding collector 112 at block 310. The status data can include a fuel or charge level for the collectors 112-1 and 112-3, which are vehicles in the present example.

The status data can also include a location (e.g., in the form of latitude and longitude coordinates obtained via GPS sensors) for each collector 112. As seen in the final two account records of Table 1, a location is assigned to the beacons 116, although the beacons 116 typically do not have location sensors. The server 104 can be configured to assign a location to a given beacon 116 based on which collector(s) 112 transmitted the asset identifier corresponding to the beacon 116. In some examples, the collectors 112 themselves or the server 104 may be configured to triangulate the position of a beacon 116. For example, when three or more collectors 112 receive the same asset identifier (at substantially the same time, as indicated by timestamp data included with the asset identifier broadcast by the beacon 116), each of the receiving collectors 112 may be configured to report the asset identifier, timestamp data and optionally signal strength data associated with the beacon broadcast, to the server 104. The server 104, in turn, is configured to determine the location of the beacon 116 relative to each of the collectors 112 (whose locations are known via the above-mentioned GPS sensors). In other examples, as shown in Table 1, the server 104 is configured to assign a location to each beacon 116 based simply on the location of a single reporting collector 112, such as the collector reporting the greatest signal strength for the detected broadcasts. In the present example, as seen in Table 1, the location assigned to each of the beacons 116-1 and 116-2 is the asset identifier of the collector 112-3, which reported the asset identifiers of the beacons 116-1 and 116-2.

Each asset record may also, for certain assets, define a storage location for the corresponding asset. In the present example, storage locations are not employed for the collectors 112, but are employed for the beacons 116. As noted earlier, the beacons 116 are typically mounted to assets without interrupt devices, and therefore cannot control such interrupts to grant or deny access to the assets to which they are mounted. Instead, in the present example, assets having beacons 116 rather than collectors 112 are stored in enclosures (e.g., shipping containers or the like) that are themselves equipped with a collector 112 connected to an interrupt in the form of a lock on the enclosure. The beacons 116 are assigned storage locations corresponding to the location of the collector 112. Thus, as seen in Table 1, the beacons 116-1 and 116-2 are assigned storage locations corresponding to the collector 112-3. When the reported locations of the beacons 116 are at or in close proximity to the location of the collector 112-3, the server 104 is further configured to update an access status attribute of the assets carrying the beacons 116 to indicate that those assets are idle (i.e., stored and not currently in use). The access status attribute of the remaining assets can be derived from access requests as discussed below, and can also be updated based on the status data received from the collectors 112. For example, changes in reported location for a given collector, as well as changes in fuel or charge state may indicate that an asset is in use.

Each asset record also includes an account identifier of the owner of the corresponding asset. As will be discussed in connection with the account records, the owner account identifier enables the server 104 to effect payment to the owner of the relevant asset responsive to use of that asset by another party. The asset record can include further payment-related data, not shown in Table 1. For example, each asset record can specify a price (e.g. per unit time of use) for the corresponding asset.

Each asset record may also include one or more operational conditions that must be satisfied before access is granted to an asset. For example, the conditions may specify one or more licenses, certifications, and the like that must be possessed by an operator in order to secure access to the corresponding asset. In the present example, the collector 112-1 is mounted to an asset requiring a particular license to operate.

At block 315, the server 104 is configured to receive a request for authorization (also referred to as an authorization request), or for authorization and access (also referred to as a combined request), via the network 108 and the interface 216. In the context of the discussion herein, an authorization request is a request for approval to access a given asset at a future time. As will become apparent, an authorization request need not be made in physical proximity to the asset to which the request relates. An access request, meanwhile, is a request made in physical proximity to the asset to which the request relates (e.g. on the same site 102 as the relevant asset), and is a request for immediate access to the asset. Authorization and access requests may be distinguished by the results of their approval: an approved authorization request results in certain actions within the system 100 that provision a given asset for future access, but do not result in control of the interrupt device of that asset by the relevant collector 112. An approved access request, on the other hand, results in control of the interrupt device of the relevant asset to enable immediate access to the asset.

Several mechanisms are contemplated for the receipt of the request at block 315. In brief, the client devices 120 may generate and send authorization requests, as well as combined requests. The collectors 112, meanwhile, may generate and send combined requests.

At block 320, a client device 120 is configured to generate one of an authorization request and a combined request. The generation of a combined request will be discussed first, in connection with FIG. 4, which illustrates a portion of the system 100 (the site 102 and associated elements of the system 100, as well as the client devices 120-2 and 120-3, are omitted).

Figure 4:
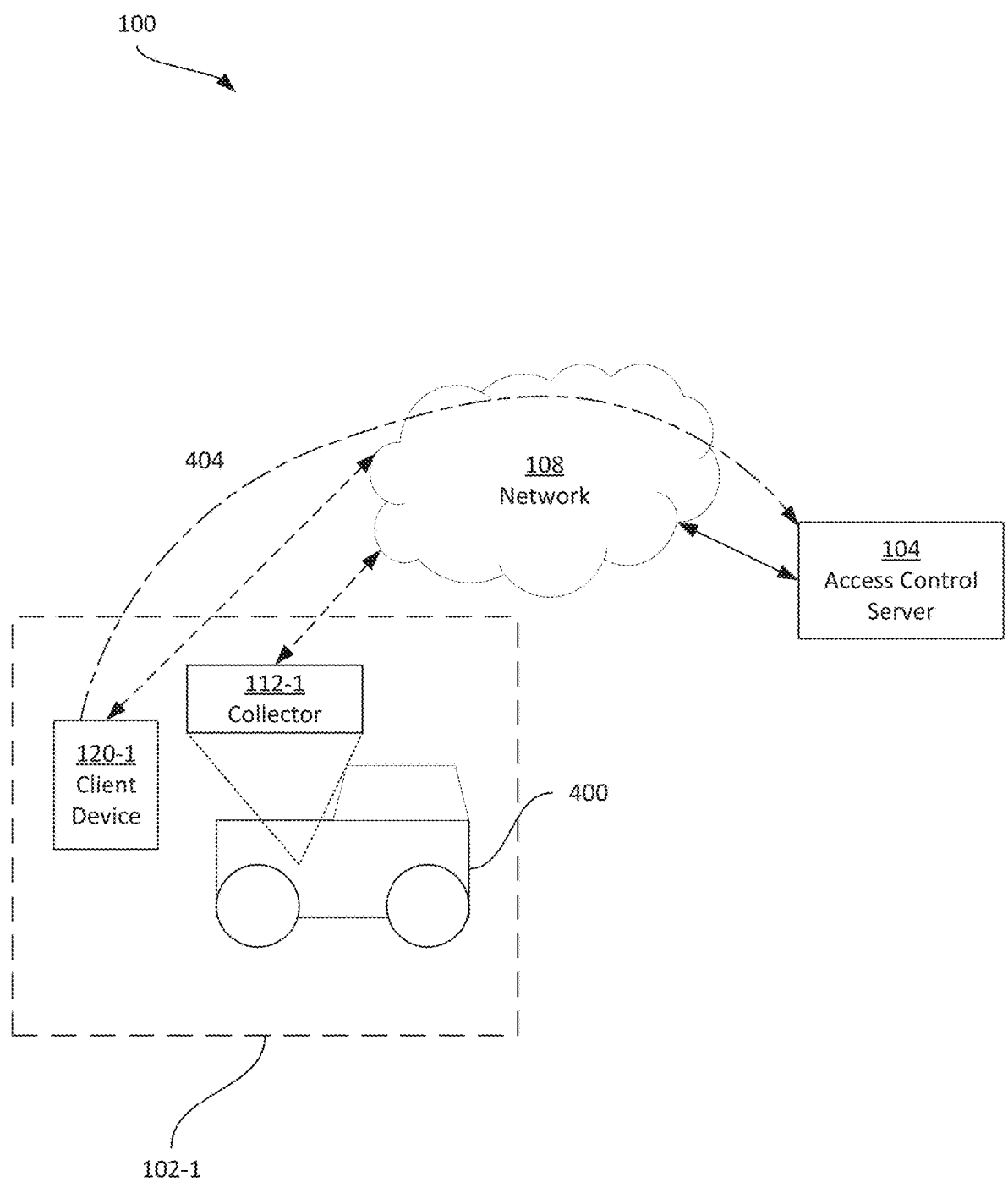
FIGS. 4-6 depict authorization requests generated in the system of FIG. 1 during the performance of the method of FIG. 3.

As shown in FIG. 4, the client device 120-1 is located at the site 102-1, and may be in close proximity (e.g. within about 30 feet) with an asset 400 to which the collector 112-1 is mounted. In the present example, as noted earlier, the asset 400 is a vehicle such as a loader. The client device 120-1 is configured to send a message to the server 104 via the network 108, e.g. via a web page previously retrieved from the server 104 by the client device 120-1, via a telephony or other messaging application (e.g. SMS) on the client device 120-1, or the like. The message transmitted at block 320 includes an identifier of the asset 400 and an identifier of an account for which an account record is stored at the server 104. The asset identifier may be obtained from the asset 400 itself. For example, the asset 400 may bear a graphical indicator such as a QR code, a specific telephone number, a string to be included in an SMS message, or the like. The asset identifier may also be received at the client device 120-1 from the collector 112-1 itself. In general, the asset identifier is sufficient to uniquely identify an asset record at the server 104. As will now be apparent, the server 104 may store a plurality of identifiers in each asset record, based on which identifiers are deployed for use by the client device 120-1 for forming requests.

The account identifier included in the asset may be a username or the like previously assigned to the client device 120-1 or the account record with which the client device 120-1 is associated at the server 104. The account identifier may also be an identifier of the device 120-1 itself, such as a telephone number or other hardware identifier (e.g. an IMEI or the like). As with the asset identifiers, the server 104 may store a plurality of account identifiers, and in some embodiments user identifiers associated with each account identifier.

Responsive to obtaining the asset identifier (e.g. by scanning a QR code or receiving input data from the operator of the client device representing an asset-specific telephone number or other string), the client device 120-1 is configured to transmit a request 404, addressed to the server 104, for authorization and access to the asset 400. The request includes an indication that it is a combined request, rather than an authorization request. For example, the client device 120-1 may present selectable options on a display thereof for generating one or the other of an authorization request and a combined request.

Figure 5:
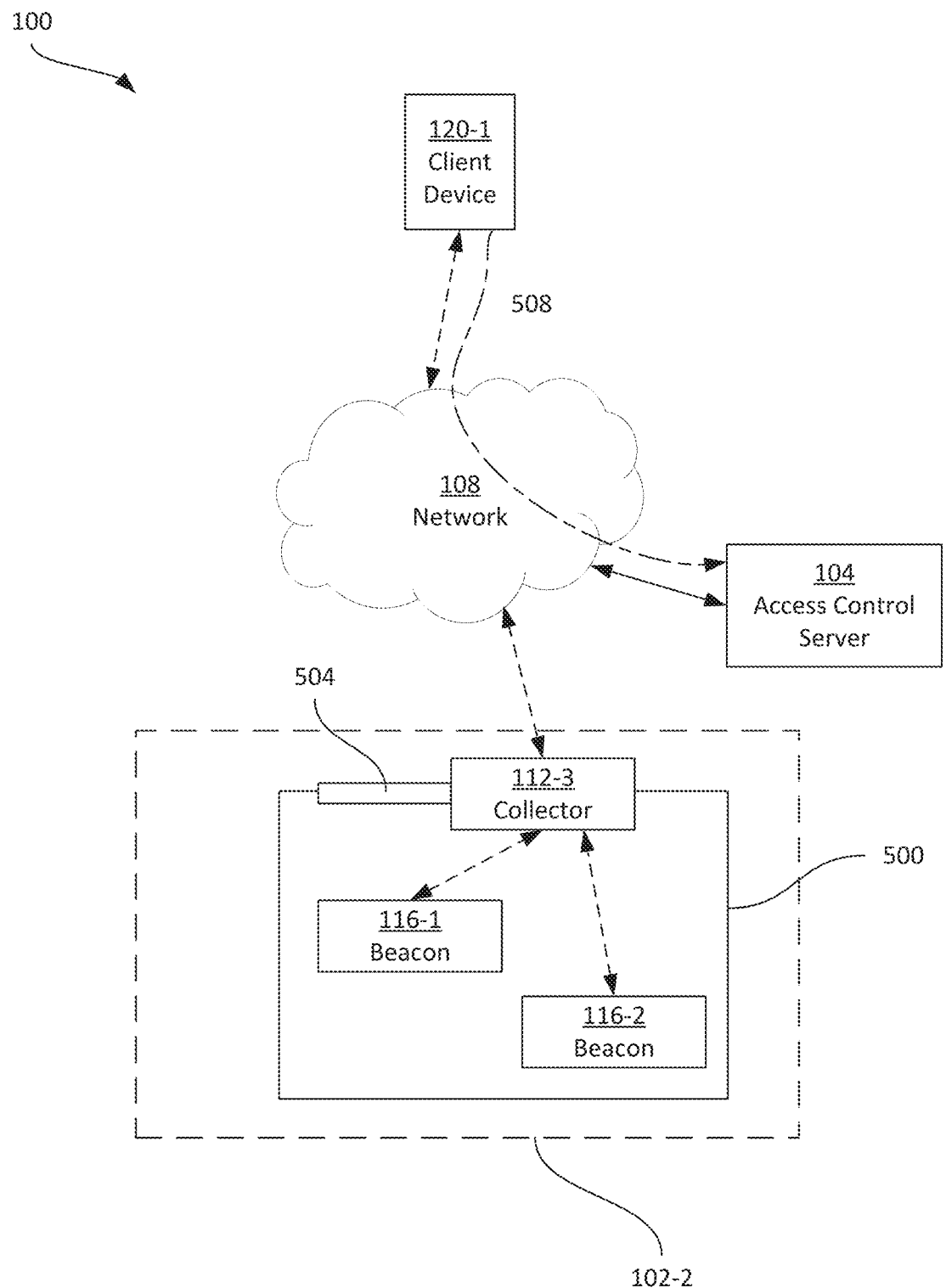

Turning now to FIG. 5, the generation of an authorization request (i.e., rather than a combined request) by the client device 120-1 at block 320 will be discussed. An authorization request may also be referred to as a request for a pre-authorized code or a "short-term" code. FIG. 5 depicts a portion of the system 100, in which the collector 112-3 is illustrated as being mounted on an enclosure 500 and operably connected to a door or other entryway 504 of the enclosure 500. The collector 112-3 is configured to control an interrupt in the form of a lock on the door 504 to permit or deny access to the interior of the enclosure 500 (and thereby to permit or deny access to the assets bearing the beacons 116-1 and 116-2).

The client device 120-1, in the example shown in FIG. 5, is not located at the site 102-2. The client device 120-1 may be configured to retrieve a listing of assets available at the site 102-2 or other sites from the server 104 (e.g. via web page requests, a dedicated asset-rental application executed by the client device 120-1, or the like). The client device 120-1 is further configured to receive a selection of the collector 112-3 or an asset bearing one of the beacons 116-1 and 116-2, and to transmit an identifier of the selected asset to the server 104 in a request 508. As with the request 404 mentioned above, the request 508 includes an account identifier, such as a telephone number, authentication parameter (e.g. a user name), or the like.

The request 508 may also include requested authorization parameters, such as start and end times for which future access is to be requested to the asset. The start and end times may be received at the client device 120-1 via input received at a keyboard, touch screen, or the like.

Figure 6:
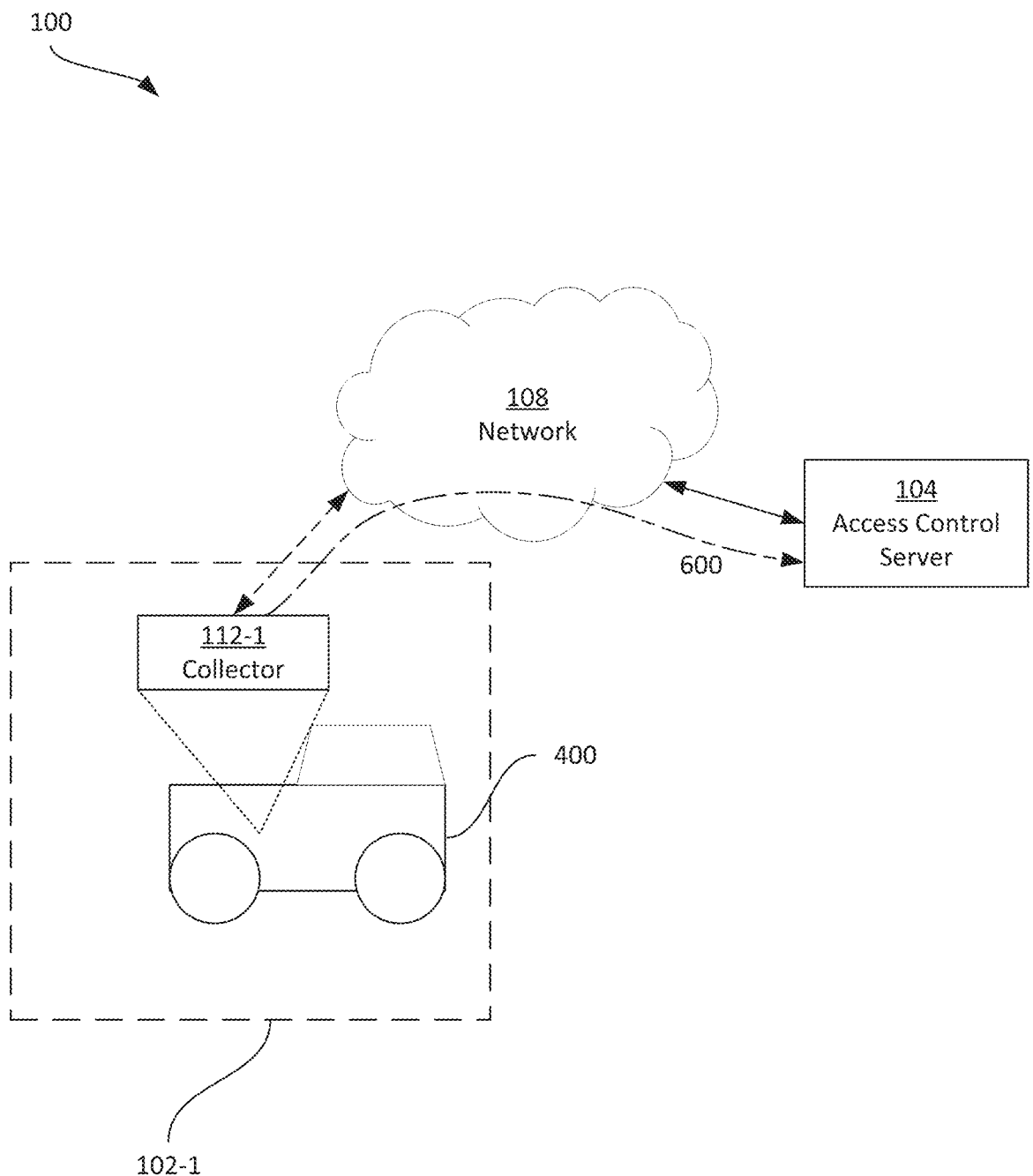

Returning to FIG. 3, the request received by the server 104 may also be a combined request received from a collector 112 rather than from a client device 120. The collector 112 can be configured to generate the request as will be discussed in connection with blocks 325-335 and FIG. 6. Turning to FIG. 6, a portion of the system 100 is shown, in which the client device 120-1 is either not present, is disabled (e.g. unable to establish a connection to the network 108) or the like. As noted earlier, each collector 112 includes an input device 274, such as a keypad. Thus, in FIG. 6 the operator (not shown) of the client device 120-1 enters a predetermined string, such as a sequence of digits, into the keypad of the collector 112-1. The predetermined string serves to identify the account with which the operator is associated. In some examples, the string is the same account identifier is mentioned in connection with the requests 404 and 508 (e.g. a telephone number corresponding to the device 120-1, username or other string previously assigned to a given account maintained by the server 104). In embodiments in which the collector 112-1 includes a biometric input device such as a fingerprint reader, the string may be derived from or replaced with fingerprint scan data (and, as will be apparent, the server 104 may store reference fingerprint scan data in association with the account records in the repository 212). In other examples, as will be discussed below, the string is a temporary string, also referred to as a pre-authorized code or a short-term code.

Having received the predetermined string at the input device 274, the collector 112-1 is configured to determine at block 330 whether the string matches any pre-authorized codes stored in the repository 260. In the present example, it is assumed that the determination at block 330 is negative, and the collector 112-1 therefore proceeds to block 335. When the determination at block 330 is negative, at block 335 the collector 112-1 is configured to generate and send a request 600 to the server 104 via the network 108. The request 600 is a combined request, and also includes an asset identifier (e.g. stored in the memory 254) corresponding to the asset 400.

Returning to FIG. 3, having received the request at block 315, the server 104 is configured to retrieve the asset record and the account record corresponding to the request. That is, each of the above request types includes an asset identifier and an account identifier. The server 104 is configured, at block 315, to retrieve the records corresponding to those identifiers. Before continuing with the performance of the method 300, an example of a set of account records stored in the repository 212 is shown below in Table 2.

TABLE 2

Example Account Records

| Account ID | Payment Data | Pre-Auth. Codes | User ID | Licenses |
|---|---|---|---|---|
| Acme Co. | 123456789 | N/A | 120-3 | N/A |
| XYZ Inc. | 987654321 | N/A | 120-1 | License A |
| | | | 120-2 | N/A |

As seen above, each account record includes an account identifier. In the present example, the account identifier is the name of the entity with which the account is associated. In other examples, the name can be stored in a separate field of the record, and the account identifier may be any other suitable alphanumeric string. Each record can also include additional account identifiers, such as telephone numbers, IMEIs, user-specific codes, or the like, which correspond to individual users associated with the account (e.g. employees of the entity named in the account ID in Table 2). In the example above, such user identifiers correspond to identifiers of client devices 120; more than one user identifier may be associated with a given account, and account administrators may instruct the server 104 to add, delete, or inactivate individual user identifiers, for example responsive to individual users being hired, terminated, placed on leave, and so on.

Each account record also includes payment data. The payment data may include, for example, one or more identifiers of accounts at a financial institution. The identified financial account is employed to receive payments for access of assets owned by the account, and to transmit payments for access of assets owned by other accounts. In some examples, separate financial account information can be stored for incoming and outgoing payments. Each account record can also include further identifying information, such as mailing addresses, contact information, and the like.

Each account record further includes indications of licenses, certifications, and the like, possessed by either the account as a whole (e.g. by Acme Co.) or by individual users associated with the account. Thus, in the example shown in Table 2, the user associated with the client device 120-1 holds a particular license referred to as "License A". In addition, each account record can include an indication of whether any pre-authorized or short-term codes are associated with the account. Such an indication may also be specific to individual users within an account record in some embodiments. As shown in Table 2, no pre-authorized codes currently exist; the generation and use of pre-authorized codes will be discussed further below.

Referring to FIG. 3, at block 340, the server 104 is configured to determine whether to authorize the request received at block 315 (regardless of whether the request is an authorization request or a combined request). The determination at block 340 is made based on the asset and account records retrieved at block 315. In particular, the server 104 is configured to compare the asset record and the account record to determine whether any operational constraints specified in the asset record are satisfied by the account record (e.g. whether the account record indicates that the user initiating the request received at block 315 meets any license or other qualification requirements specified by the asset record). The server 104 can also be configured, prior to the above comparison, to determine whether the relevant asset is available for use based on the "access status" field shown in Table 1. For example, if the asset is currently in use, the determination at block 340 is negative.

When the determination at block 340 is negative, the server 104 proceeds to block 345, at which a denial message is returned to the client device 120 or the collector 112 that sent the request received at block 315. The nature of the denial message is not particularly limited. In some examples, the denial message may indicate a reason for the denial (e.g. a licensing or certification requirement not being met). In other examples, the denial message may simply indicate that authorization has been denied. At blocks 350 and 355, respectively, the client device 120-1 and the collector 112-1 are configured to receive and present the denial message (e.g. on a display, by playing an audible tone, or the like).

When the determination at block 340 is affirmative, however, the server 104 proceeds to block 360 to determine whether access was requested in the request received at block 315 in addition to authorization. The determination at block 360 is based on the content of the request, and may also be based on the origin of the request. For example, requests received from collectors 112 may always be treated as combined requests, and the determination at block 360 for such requests is therefore affirmative. Requests received from client devices 120, on the other hand, may be either authorization requests or combined requests. The server 104 is therefore configured to determine whether the request includes the above-mentioned indication that it is an authorization request or a combined request.

When the determination at block 360 is affirmative, the server 104 is configured to proceed to block 365 and transmit an access granting command to the collector 112 corresponding to the asset record retrieved at block 315. The command is an instruction to the collector 112 to operate the interrupt device connected thereto via the interface 270 to permit access to the asset (e.g. by unlocking an enclosure or a vehicle, disabling an ignition lock on a vehicle, or the like). In some embodiments, prior to sending the access grant command at block 365, and when the request at block 315 was received from a client device 120, the server 104 is configured to determine whether the requesting client device is within a predefined distance of the asset to which access was requested. The predefined distance is stored in the memory 204, and serves to grant access to assets only when the requestor is in close proximity to the asset (e.g., within about 30 feet of the asset location as reflected by the asset record retrieved at block 315). If the requesting client device 120 is not within the predefined distance, the server 104 can instead be configured to proceed to block 345.

At block 370, the collector 112 is configured to receive the access grant command, and at block 375 the collector 112 is configured to operate the interrupt device connected to the processor 250 via the interface 270 to allow access to the asset. The collector 112 is configured to return to block 305 to collect and transmit further status data. For example, the collector 112 may transmit status data indicating that the asset is in use following block 375. Responsive to such status data, the server 104 can be configured to update the corresponding asset record to change the access status field. In other examples, the server 104 is configured to update the access status field at block 365. For example, the account identifier, user identifier, or both, can be stored in the access status field at block 365.

Certain collectors 112, such as the collector 112-3 in FIGS. 1 and 5, enable access to a plurality of assets bearing beacons 116. Following the performance of block 375 by such collectors 112, the collector 112 is configured to monitor the beacons 116 detected via the interface 262 after a predefined period of time following the performance of block 375. Any beacons 116 that are no longer detected after the period of time, but that were detected previously, are assumed to have been removed from the enclosure 500. In subsequent performances of blocks 305 and 310, therefore, the server 104 is configured to mark the relevant asset record (e.g. the record corresponding to the beacon 116-2 as being currently in use by the account identifier associated with the request granted at block 340.

In other embodiments, if beacons 116 include short-ranged (e.g. RFID-based) communication assemblies, users may be required to present each asset being removed from the enclosure 500 to the collector 112-3 upon exiting the enclosure 500. The server 104 is configured to identify one or more equipment records based on such further transmissions from the collector 112-3, and mark those equipment records as being in use.

As will now be apparent, a subsequent performance of block 305 may indicate that the asset is no longer in use. For example, the location of the asset may have remained unchanged for a predefined time period, power to the asset may have been disabled, or the like. In the case of the enclosure 500, the collector 112-3 may detect the return of the beacon 116-2. In some examples, the collector 112 is configured to monitor the presence of a client device 120 (e.g. via a Bluetooth™ connection), and to indicate to the server 104 that the asset is no longer in use when the device 120 severs the connection (e.g. indicating that the user has left the vicinity of the collector 112). The server 104 can then update the appropriate asset record, remotely disable the asset via a further instruction to the collector 112, and initiate a financial transaction to compensate the owner identified in the asset record for the use of the asset.

The server 104 can also be configured to store data in each account record tracking asset usage (e.g. a number of hours during which a user associated with the account was granted access to a given asset). In other embodiments, the server 104 can be configured to track usage statistics in account records by type of asset rather than by individual asset identifier (e.g. separate usage statistics for an account for any skid loader, rather than for each individual skid loader operated by the account-holder).

Returning to block 360 of the method 300, when the determination at block 360 is negative, indicating that the request received at block 315 was an authorization request rather than a combined request, the server 104 is configured to proceed to block 380 rather than block 365. At block 380, the server 104 is configured to generate a pre-authorized code and transmit the pre-authorized code to both the client device 120 that sent the request at block 320, and the collector 112 corresponding to the asset record retrieved at block 315.

The pre-authorized code is received by the client device 120 at block 385 and by the collector 112 at block 390. In the example of FIG. 5, in which the authorization request 508 was generated by the client device 120-1, at block 385 the client device 120-1 can receive and display (and may also store in a memory) the pre-authorized code, and at block 390, the collector 112-3 receives the pre-authorized code and stores the pre-authorized code in the repository 260. The collector 112-3 may also receive and store a time period associated with the pre-authorized code, indicating when the pre-authorized code is valid. Following expiry of the time period, the collector 112-3 can be configured to delete the pre-authorized code from the repository 260.

The server 104 is also configured to store the pre-authorized code in the account record corresponding to the client device 120-1, for example in the "Pre-Auth Codes" field shown in Table 2. The above-mentioned valid time period may also be stored in the account record, along with the asset identifier corresponding to the collector 112-3.

As will now be apparent, the provision of pre-authorized codes as described above permits access to be gained to an asset in the absence of a connection between the network 108 and one or both of a client device 120 and a collector 112. Returning to block 330, when a code is received by a collector 112 that matches a pre-authorized code stored in the repository 260 (and when the current time falls within the valid time period specified for the pre-authorized code), the collector 112 proceeds directly to block 375, enabling access to the corresponding asset without requiring contact between the collector 112 or the client device 120 and the server 104. Pre-authorized codes may therefore be obtained in advance of a task to be performed at a site 102 known to have poor network connectivity, for example, and distributed to users associated with the account for which the pre-authorized code was obtained.

Variations to the above systems and methods are contemplated. For example, the server 104 can be configured to perform additional tasks based on the status data received at block 310, such as the generation of alerts when licenses or other certifications are approaching expiry and must be renewed. The server 104 can also be configured, for example, to apply predictive models to operational measurements such as battery charge levels, to generate predicted future charge levels (e.g., to predict when the battery of an asset will require charging, replacement or the like). The server 104 can be configured to generate alerts containing such predicted metrics, for transmission to client devices 120 associated with the account marked as the owner of the relevant asset.

Those skilled in the art will appreciate that in some embodiments, the functionality of one or both of the applications 208 and 258, as executed by the processors 200 and 250, respectively, may be implemented using pre-programmed hardware or firmware elements, such as application specific integrated circuits (ASICs), field-programmable gate arrays (FPGAs), and the like.

The scope of the claims should not be limited by the embodiments set forth in the above examples, but should be given the broadest interpretation consistent with the description as a whole.

The invention claimed is:

1. A system for controlling access to a physical asset comprising a construction vehicle with an interrupt device, comprising:
   an access control server configured to store (i) an asset record corresponding to the physical asset and containing an asset identifier and (ii) an account record corresponding to a user of the physical asset and containing an account identifier; and
   a collector device mounted on the physical asset and including:
      a memory configured to store the asset identifier;
      a plurality of input devices including a (i) a first input device comprising a keypad configured to receive a first input from the user of the physical asset, wherein the first input comprises a predetermined string associated with the account record of the user of the physical asset and (ii) a second input device comprising a biometric input device configured to receive a second input from the user of the physical asset;
      a plurality of communications interfaces including (i) a telematics interface configured to enable communication with the interrupt device of the physical asset and (ii) a remote interface configured to enable communication with the access control server; and
      a processor configured to (i) determine whether the first input and the second input are both valid based on information received from the access control server via the remote interface and (ii) when the determination is affirmative, operate the interrupt device via the telematics interface to permit access to the physical asset.

2. The system of claim 1, wherein the biometric input device comprises one of a fingerprint sensor and a camera.

3. The system of claim 1, wherein the predetermined string comprises the account identifier, and wherein the collector device is configured to transmit an access request containing the account identifier and the asset identifier to the access control server via the remote interface.

4. The system of claim 3, wherein the access control server is configured to (i) receive the access request containing the account identifier and the asset identifier, (ii) determine, based on a comparison between the asset record and the account record, whether to authorize the access request, and (iii) when the determination is affirmative, transmit an instruction to the collector device indicating that the first input is valid.

5. The system of claim 1, wherein the predetermined string comprises a pre-authorized code, wherein the collector device is configured to store a pre-authorized code repository comprising one or more pre-authorized codes received from the access control server via the remote interface, and wherein the collector device is configured to (i) determine whether the pre-authorized code matches one of the pre-authorized codes in the pre-authorized code repository and (ii) when the determination is affirmative, provide an indication that the first input is valid.

6. The system of claim 5, wherein the access control server is configured to (i) receive an authorization request containing the account identifier and the asset identifier from a client computing device, (ii) determine, based on a comparison between the asset record and the account record, whether to authorize the authorization request, and (iii) when the determination is affirmative, transmit the pre-authorized code to both the collector device for storage in the pre-authorized code repository and the client computing device.

7. The system of claim 1, wherein the second input device comprises a fingerprint sensor, and wherein the second input comprises fingerprint scan data associated with the account record of the user of the physical asset.

8. The system of claim 7, wherein the collector device is configured to transmit an access request containing the fingerprint scan data and the asset identifier to the access control server via the remote interface.

9. The system of claim 8, wherein the account record contains reference fingerprint scan data, and wherein the access control server is configured to (i) receive the access request containing the fingerprint scan data and the asset identifier, (ii) determine, based on a comparison between the asset record and the account record, whether to authorize the access request, and (iii) when the determination is affirmative, transmit an instruction to the collector device indicating that the second input is valid.

10. A system for controlling access to a physical asset with an interrupt device, comprising:
an access control server configured to store (i) an asset record corresponding to the physical asset and containing an asset identifier and (ii) an account record corresponding to a user of the physical asset and containing an account identifier;
a collector device mounted on the physical asset and configured to store the asset identifier and a pre-authorized code repository comprising one or more pre-authorized codes received from the access control server, wherein the collector device includes a (i) first input device comprising a keypad configured to receive a first input from the user of the physical asset and (ii) a second input device comprising a biometric input device configured to receive a second input from the user of the physical asset;
wherein the collector device is configured to authenticate the user of the physical asset by determining whether the first input and the second input are both valid, wherein the first input comprises a pre-authorized code, wherein the collector device is configured to (i) determine whether the pre-authorized code matches one of the pre-authorized codes in the pre-authorized code repository and (ii) when the determination is affirmative, provide an indication that the first input is valid, and wherein the collector device is further configured to operate the interrupt device to permit access to the physical asset responsive to validation of the first input and the second input.

11. The system of claim 10, wherein the physical asset comprises a construction vehicle.

12. The system of claim 10, wherein the physical asset comprises a storage enclosure.

13. The system of claim 10, wherein the biometric input device comprises one of a fingerprint sensor and a camera.

14. The system of claim 10, wherein the access control server is configured to (i) receive an authorization request containing the account identifier and the asset identifier from a client computing device, (ii) determine, based on a comparison between the asset record and the account record, whether to authorize the authorization request, and (iii) when the determination is affirmative, transmit the pre-authorized code to both the collector device for storage in the pre-authorized repository and the client computing device.

15. The system of claim 10, wherein the second input device comprises a fingerprint sensor, and wherein the second input comprises fingerprint scan data associated with the account record of the user of the physical asset.

16. The system of claim 15, wherein the collector device is configured to transmit an access request containing the fingerprint scan data and the asset identifier to the access control server.

17. The system of claim 16, wherein the account record contains reference fingerprint scan data, and wherein the access control server is configured to (i) receive the access request containing the fingerprint scan data and the asset identifier, (ii) determine, based on a comparison between the asset record and the account record, whether to authorize the access request, and (iii) when the determination is affirmative, transmit an instruction to the collector device indicating that the second input is valid.

18. A collector device for controlling access to a physical asset with an interrupt device, comprising:
a plurality of input devices including a (i) a first input device comprising a keypad configured to receive a first input and (ii) a second input device comprising a biometric input device configured to receive a second input;
a plurality of communications interfaces including (i) a telematics interface configured to enable communication with the interrupt device of the physical asset and (ii) a remote interface configured to enable communication with an access control server; and
a processor configured to (i) determine whether the first input and the second input are both valid based on information received from the access control server via the remote interface and (ii) when the determination is affirmative, operate the interrupt device via the telematics interface to permit access to the physical asset.

19. The system of claim 18, wherein the physical asset comprises a construction vehicle or a storage enclosure.

20. The system of claim 18, wherein (i) the first input comprises a predetermined string of digits and (ii) the second input comprises fingerprint scan data.

21. The system of claim 20, wherein the predetermined string comprises an account identifier, and wherein the collector device is configured to (i) transmit an access request containing the account identifier via the remote interface and (ii) receive an instruction indicating that the first input is valid via the remote interface.

22. The system of claim 20, wherein the predetermined string comprises a pre-authorized code, wherein the collector device is configured to store a pre-authorized code repository comprising one or more pre-authorized codes received via the remote interface, and wherein the collector device is configured to (i) determine whether the pre-authorized code matches one of the pre-authorized codes in the pre-authorized code repository and (ii) when the determination is affirmative, provide an indication that the first input is valid.

23. The system of claim 20, wherein the collector device is configured to (i) transmit an access request containing the fingerprint scan data via the remote interface and (ii) receive an instruction indicating that the second input is valid via the remote interface.

* * * * *